United States Patent
Nagano

(10) Patent No.: US 12,035,196 B2
(45) Date of Patent: Jul. 9, 2024

(54) RADIO COMMUNICATION APPARATUS, COMMUNICATION MEANS SWITCHING METHOD, AND NON-TRANSITORY COMPUTER READABLE MEDIUM

(71) Applicant: NEC Corporation, Tokyo (JP)

(72) Inventor: Hiroaki Nagano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 339 days.

(21) Appl. No.: 17/437,654

(22) PCT Filed: Jan. 10, 2020

(86) PCT No.: PCT/JP2020/000736
§ 371 (c)(1),
(2) Date: Sep. 9, 2021

(87) PCT Pub. No.: WO2020/188968
PCT Pub. Date: Sep. 24, 2020

(65) Prior Publication Data
US 2022/0174571 A1    Jun. 2, 2022

(30) Foreign Application Priority Data
Mar. 19, 2019 (JP) ................. 2019-050462

(51) Int. Cl.
*H04W 36/30* (2009.01)
*H04B 17/345* (2015.01)
*H04W 84/12* (2009.01)

(52) U.S. Cl.
CPC .......... *H04W 36/30* (2013.01); *H04B 17/345* (2015.01); *H04W 84/12* (2013.01)

(58) Field of Classification Search
CPC ............................ H04W 36/30; H04B 17/345
See application file for complete search history.

(56) References Cited

U.S. PATENT DOCUMENTS

| 2006/0045033 A1* | 3/2006 | Fukuhara | H04W 36/30 370/310 |
| 2010/0128673 A1 | 5/2010 | Yamazaki et al. | |
| 2012/0202538 A1* | 8/2012 | Uusitalo | H04B 17/3912 455/500 |

FOREIGN PATENT DOCUMENTS

| JP | 2001-230735 A | 8/2001 |
| JP | 2004-282270 A | 10/2004 |

(Continued)

OTHER PUBLICATIONS

International Search Report for PCT Application No. PCT/JP2020/000736, mailed on Mar. 10, 2020.

(Continued)

*Primary Examiner* — Derrick V Rose

(57) ABSTRACT

A radio communication apparatus includes a communication selecting unit for switching a plurality of communication units from one to another, a storage unit to hold spatial positions of a plurality of fixed stations for the communication means or semi-fixed stations for which position information can be acquired, and a characteristic of a radio wave used by the communication unit; an interference source prediction unit for monitoring a position of an interference source that will interfere with the communication unit, and predicting the position, a moving direction, and a characteristic of the interference source; and an interference determination unit for determining whether or not interference will occur as the spatial position and the characteristic of the radio wave held by the storage unit overlap with the position and the characteristic of the interference source predicted by the interference source prediction unit.

8 Claims, 2 Drawing Sheets

(56) References Cited

FOREIGN PATENT DOCUMENTS

| | | |
|---|---|---|
| JP | 2008-252330 A | 10/2008 |
| JP | 2011-009974 A | 1/2011 |
| JP | 2012-065138 A | 3/2012 |
| JP | 2012-114715 A | 6/2012 |
| JP | 2017-183922 A | 10/2017 |
| WO | 2015/045307 A1 | 4/2015 |

OTHER PUBLICATIONS

"Consulting on Problem in Radio Communication", [online], NEC Corporation, searched on Mar. 1, 2019 (URL: https://jpn.nec.com/iot/platform/consulting-wireless/index.html), pp. 1-3.

* cited by examiner

RADIO COMMUNICATION APPARATUS, COMMUNICATION MEANS SWITCHING METHOD, AND NON-TRANSITORY COMPUTER READABLE MEDIUM

This application is a National Stage Entry of PCT/JP2020/000736 filed on Jan. 10, 2020, which claims priority from Japanese Patent Application 2019-050762 filed on Mar. 19, 2019, the contents of all of which are incorporated herein by reference, in their entirety.

TECHNICAL FIELD

This present invention relates to a radio communication apparatus, a communication means switching method, and a non-transitory computer readable medium. For example, the present invention relates to a radio communication apparatus, a communication means switching method, and a non-transitory computer readable medium for predicting an interference source, and switching communication means before it interferes with the interference source.

BACKGROUND ART

Radio communication is affected by external radio-wave sources and obstacles. Therefore, when only one communication means is used, it may be affected by interference or the like, and thus may not be able to perform communication.

Patent Literature 1 discloses, in order to improve tolerance to failures and improve availability, using selected one of a plurality of communication means while switching the selected one from one communication means to another, and also discloses using a plurality of communication means together at the same time. However, in the technique disclosed in Patent Literature 1, the choice of communication means is reexamined after the communication state has deteriorated, so that it is impossible to avoid a temporary deterioration of the communication state and/or an increase in delay.

Each of Patent Literatures 2 and 3 discloses switching communication means according to a predicted communication status and a predicted change of weather in order to solve the problem of the temporary deterioration of the communication status and/or the increase in delay which may be caused because the choice of communication means is reexamined after the communication status has deteriorated.

CITATION LIST

Patent Literature

Patent Literature 1: Japanese Unexamined Patent Application Publication No. 2004-282270
Patent Literature 2: Japanese Unexamined Patent Application Publication No. 2011-009974
Patent Literature 3: International Patent Publication No. WO2015/045307

Non Patent Literature

Non-patent Literature 1: "Consulting on Problem in Radio Communication", [online], NEC Corporation, [searched on Mar. 1, 2019], (URL: https://jpn.nec.com/iot/platform/consulting-wireless/index.html)

SUMMARY OF INVENTION

Technical Problem

In the methods disclosed in Patent Literatures 1 to 3, it is difficult to cope with a radio-wave interference source or the like that unexpectedly approaches. Therefore, in the methods disclosed in Patent Literatures 1 to 3, after all, a radio interference source or the like that unexpectedly approaches will be detected after radio-wave interference has actually occurred.

In view of the above-described problem, an object of the present disclosure is to provide a radio communication apparatus, a communication means switching method, and a non-transitory computer readable medium capable of preventing an interference source which is difficult to predict from affecting communication by switching, in advance, communication means to one that is not affected by the interference source.

Solution to Problem

A radio communication apparatus according to an example embodiment includes: communication selecting means for switching a plurality of communication means from one to another; a storage unit configured to hold spatial positions of a plurality of fixed stations for the communication means or semi-fixed stations for which position information can be acquired, and a characteristic of a radio wave used by the communication means; interference source prediction means for monitoring a position of an interference source that will interfere with the communication means, and predicting the position, a moving direction, and a characteristic of the interference source; and interference determination means for determining whether or not interference will occur as the spatial position and the characteristic of the radio wave held by the storage unit overlap with the position and the characteristic of the interference source predicted by the interference source prediction means.

Advantageous Effects of Invention

According to an example embodiment, it is possible to provide a radio communication apparatus, a communication means switching method, and a non-transitory computer readable medium capable of preventing an interference source which is difficult to predict from affecting communication by switching, in advance, communication means to one that is not affected by the interference source.

DESCRIPTION OF EMBODIMENTS

Example Embodiment

Figure 1:
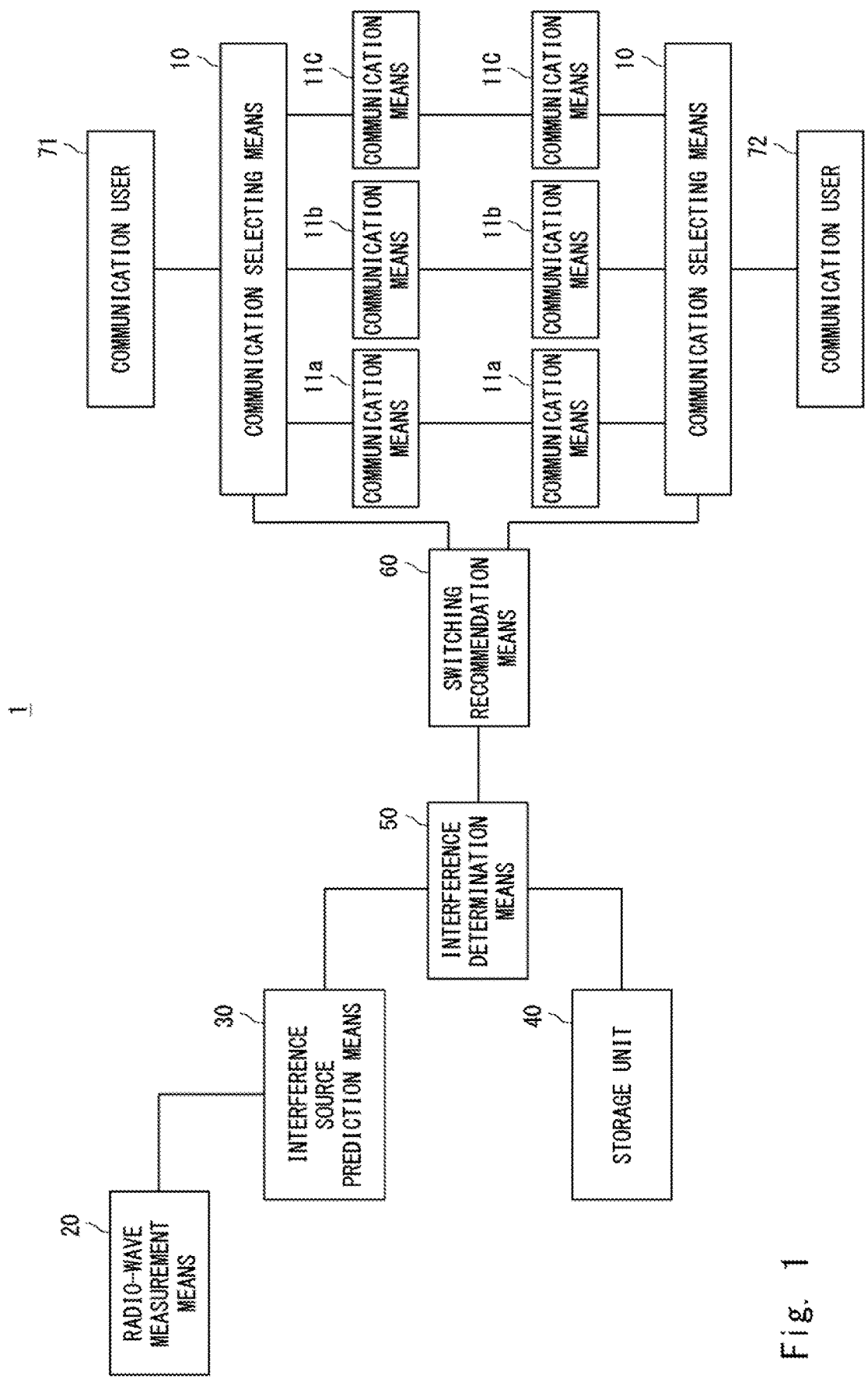
FIG. 1 shows a configuration of an example of a radio communication apparatus according to an example embodiment.
Figure 2:
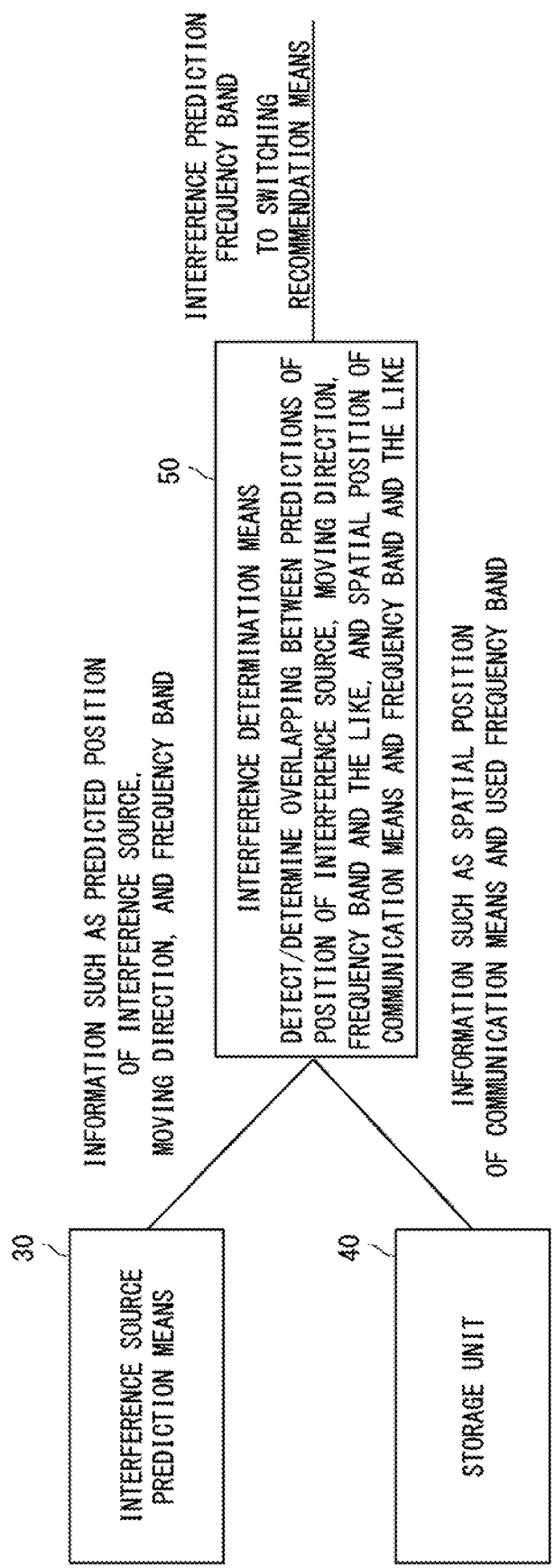
FIG. 2 shows a configuration of an example of interference source prediction means, a storage unit, and interference determination means of the radio communication apparatus according to the example embodiment.

A radio communication apparatus according to an example embodiment will be described. FIG. 1 shows a configuration of an example of a radio communication apparatus 1 according to an example embodiment. FIG. 2 shows a configuration of an example of interference source prediction means 30, a storage unit 40, and interference determination means 50 of the radio communication apparatus 1 according to the example embodiment. As shown in FIGS. 1 and 2, the radio communication apparatus 1 includes communication selecting means 10, radio-wave measurement means 20, interference source prediction means 30, storage unit 40, interference determination means 50, and switching recommendation means 60. The radio communication apparatus 1 selects communication means of which the communication conditions are satisfactory from among a plurality of communication means 11a to 11c for communication between one communication user 71 and another communication user 72, and thereby provides stable communication to the communication users. Each of the communication means 11a to 11c includes, for example, a wireless LAN device.

The communication selecting means 10 switches, for example, the plurality of communication means 11a to 11c from one to another. Each of the plurality of communication means 11a to 11c may include a wireless LAN device. The communication users 71 and 72 communicate with each other while switching the plurality of communication means 11a to 11c from one to another, or by using them together at the same time through (i.e., by using) the communication selecting means 10. Under normal conditions, the communication selecting means 10 selects communication means of which the conditions are satisfactory from among the plurality of communication means 11a to 11c.

The radio-wave measurement means 20 finds the appearance of an interference source, and specifies the position and characteristics of the interference source. Then, the radio-wave measurement means 20 notifies the interference source prediction means 30 of the specified position and characteristics of the interference source. Examples of the interference source include external radio-wave sources and obstacles. Examples of the characteristics of the interference source include the frequency band of radio waves with which the interference source may interfere. The radio-wave measurement means 20, through a continuous observation, finds the appearance of an interference source, and specifies the position of the interference source that has appeared and the frequency band thereof which may cause interference. The radio-wave measurement means 20 specifies, for example, a radio wave source or an obstacle that enters the area of a radio network of a wireless LAN as an interference source. The area of the radio network of the wireless LAN is formed by a plurality of fixed stations for the wireless LAN or semi-fixed stations for which the position information can be acquired.

The interference source prediction means 30 monitors the position of an interference source that interferes with the communication means 11a to 11c, and predicts the moving direction, the speed, and the characteristics of the interference source. The interference source prediction means 30 continuously monitors the position of the interference source of which the radio-wave measurement means 20 has measured the radio-wave status, and thereby predicts the position, the moving direction, and the speed of the interference source.

For example, a radio-wave status in a building may be predicted by measuring a propagation status of radio waves described in Non-patent Literature 1 by using the above-described radio-wave measurement means 20 and the interference source prediction means 30. According to this method, it is possible to detect the presence of an interference source and, by keeping track of changes in the status, to predict the position and the moving direction of the interference source.

The storage unit 40 holds the spatial positions of a plurality of fixed stations for the communication means 11a to 11c or semi-fixed stations for which the position information can be acquired. Further, the storage unit 40 also holds the characteristics of radio waves used by the communication means 11a to 11c. The characteristics of radio waves are, for example, frequencies and strengths thereof.

The interference determination means 50 determines whether or not interference will occur as the spatial positions and the characteristics of the communication means 11a to 11c held by the storage unit 40 overlap with the position and the characteristics of the interference source predicted by the interference source prediction means 30. The spatial positions of the communication means 11a to 11c are, for example, the spatial positions of a plurality of fixed stations for the communication means 11a to 11c or semi-fixed stations for which the position information can be acquired.

Further, the interference determination means 50 may also predict a collision between the moving direction, the speed, and the characteristics of the interference source in the area of the radio network, and the spatial positions of the communication means 11a to 11c and the propagative relative positions of radio waves in the area of the radio network. The propagative relative positions of radio waves are, for example, a spatial distribution of strengths of radio waves as the radio waves propagate.

When the interference determination means 50 determines that there is a possibility of interference, it notifies the switching recommendation means 60 of information about the interference source by which the interference may occur. Note that when the interference determination means 50 determines that there is a possibility of interference, it may instruct the communication selecting means 10 to switch the communication means to another one.

The switching recommendation means 60 receives the information indicating that the interference determination means 50 has determined that there is a possibility of interference, and instructs the communication selecting means 10 to switch the communication means to another one.

Next, as operations performed by the radio communication apparatus 1 according to this example embodiment, a method for switching communication means will be described. The communication users 71 and 72 communicate with each other while switching the plurality of communication means 11a to 11c from one to another, or using them together at the same time through (i.e., by using) the communication selecting means 10. Each of the plurality of communication means 11a to 11c may include a wireless LAN device. Under normal conditions, the communication selecting means 10 selects communication means of which the conditions are satisfactory from among the plurality of communication means 11a to 11c. In this way, the radio communication apparatus 1 provides stable communication to the communication users 71 and 72.

Next, the spatial positions of the communication means 11a to 11c and the characteristics of radio waves used by the communication means 11a to 11c are held (i.e., stored). Specifically, the storage unit 40 holds the spatial positions of a plurality of fixed stations for the communication means 11a to 11c or semi-fixed stations for which the position information can be acquired. Further, the storage unit 40 also holds frequencies and strengths of radio waves used by the communication means 11a to 11c. Further, in the case where there is a relay station(s) between communication means in communication in which the same access point through which wireless LAN slave devices access each other, individual access points connected through a wired LAN, mesh WiFi, and the like are used, the storage unit 40 holds spatial position information of the relay station(s) and radio-wave characteristics thereof. In this way, the switching of the communication means to be used may include a change of a spatial path because of the switching of the relay station. Further, the communication means to be switched by the above-described switching may include only the communication means used by the relay station that communicates with one of the communication terminals which communicate with each other. Alternatively, the communication means used by the other communication terminal as well as the communication terminal used by the relay station may also be switched as a result of the switching of the relay station to be used. In the case where only the communication means used by the relay station is switched, it may be a model in which a switching function is provided in the relay station (or the relay station group).

Next, the appearance of an interference source is found, and the position and characteristics of the interference source are specified. Specifically, the radio-wave measurement means 20, through a continuous observation, finds the appearance of an interference source, and specifies the position of the interference source that has appeared and the frequency band thereof which may cause interference. Then, the radio-wave measurement means 20 notifies the interference source prediction means 30 of the specified position and characteristics of the interference source.

Next, the position of the interference source that will interfere with the communication means 11a to 11c is monitored, and the position, the moving direction, the speed, and the characteristics of the interference source are predicted. Specifically, the interference source prediction means 30 predicts the position, the moving direction, and the speed of the interference source based on the position and characteristics of the interference source of which the interference source prediction means 30 has been notified by the radio-wave measurement means 20.

Next, it is determined whether or not interference will occur as the spatial positions and characteristics of the communication means 11a to 11c overlap with the predicted position and the characteristics of the interference source. Specifically, the interference determination means 50 determines whether or not interference will occur as the spatial positions and characteristics of the communication means 11a to 11c held by the storage unit 40 overlap with the position and characteristics of the interference source predicted by the interference source prediction means 30.

Further, the interference determination means 50 may also predict a collision between the moving direction, the speed, and the characteristics of the interference source in the area of the radio network, and the spatial positions of the communication means 11a to 11c and the radio-wave propagative relative positions of radio waves in the area of the radio network.

Next, when it is determined that interference will occur as the spatial positions and characteristics of the communication means 11a to 11c overlap with the predicted position and characteristics of the interference source, the communication means 11a to 11c are switched from one to another. Specifically, the switching recommendation means 60 receives the information indicating that the interference determination means 50 has determined that there is a possibility of interference, and instructs the communication selecting means 10 to switch the communication means to another one. Note that the interference determination means 50 may instruct the communication selecting means 10 to switch the communication means to another one by transmitting the information indicating that it has determined that there is a possibility of interference to the communication selecting means 10. In this way, it is possible to switch the communication means to another one.

Next, advantageous effects of this example embodiment will be described. The radio communication apparatus 1 according to this example embodiment determines whether or not an interference source will interfere with the communication means by using the position and characteristics of the interference source predicted by the interference source prediction means 30. Therefore, it is possible to, before the interference source actually affects the communication means 11a to 11b, switch the communication means to another one. In this way, it is possible to prevent an interference source which is difficult to predict from affecting communication by switching, in advance, communication means to one that is not affected by the interference source.

Further, the interference source includes a radio-wave source or an obstacle that enters the area of a radio network formed by a plurality of fixed stations for a wireless LAN or semi-fixed stations for which the position information can be acquired. Further, the interference determination means 50 predicts a collision between the moving direction and speed of the interference source in the area of the radio network, and the spatial positions of the communication means 11a to 11c and the propagative relative positions of radio waves in the area of the radio network. When the interference determination means 50 determines that interference will occur, it switches the communication means 11a to 11c from one to another by using the communication selecting means 10. In this way, it is possible, for an interference source that will enter the area of the radio network but is difficult to predict, to switch, in advance, the communication means 11a to 11c from one to another one that is not affected by the interference source. Therefore, it is possible to prevent the interference source from affecting communication.

Further, the radio-wave measurement means 20 finds the appearance of an interference source, specifies the position and characteristics of the interference source, and notifies the interference source prediction means 30 thereof. Therefore, even for an interference source that unexpectedly appears, it is possible to prepare for the switching of the communication means 11a to 11c before the interference source actually interferes with the communication means.

As described above, the radio communication apparatus 1 according to this example embodiment can provide a plurality of communication means 11a to 11c which are highly tolerant to failures by switching the communication means 11a to 11c from one to another or using them together at the same time. Further, it is possible to detect a situation in which an object or like that will cause radio-wave interference or the like is approaching in the vicinity by using the radio-wave measurement means 20, which is configured to measure a radio-wave status, and to switch the currently-used one of the communication means 11a to 11c which is expected to be affected by the interference to another one of the communication means 11a to 11c.

When it is attempted to make the control of a robotic apparatus or the like wireless, the fact that unexpected communication interference or the like that inevitably cannot be avoided makes the control thereof very difficult poses a challenge. In many cases, when interference is coped with after it occurs, it may be impossible to cope with the interference within a permissible time range, thus preventing the control from being made wireless. However, according to this example embodiment, the approach of an interference source is predicted before it reaches the area where the interference source actually affects the communication means 11a to 11c. Therefore, for an interference source which is difficult to predict, it is possible to switch, in advance, communication means to one that is not affected by the interference source, and thereby to prevent the interference source from affecting radio communication.

The radio communication apparatus 1 according to this example embodiment does not prevent other means for avoiding predictable interference or the like from being used together with the radio communication apparatus 1. Information based on a predicted interference source(s) and/or an obstacle(s) may be used as an input to the switching recommendation means 60 as well as an input to the interference determination means 50.

Note that the present invention is not limited to the above-described example embodiment, and they may be modified as appropriate without departing from the scope and spirit of the invention. For example, the below-shown communication means switching program for causing a computer to perform a communication means switching method according to this example embodiment is also included in the scope of the technical concept of the example embodiment.

A communication switching program for causing a computer to perform:
   switching a plurality of communication means from one to another;
   holding spatial positions of the communication means and characteristics used by the communication means;
   monitoring a position of an interference source that will interfere with the communication means, and predicting a moving direction and a speed of the interference source; and
   determining whether or not interference will occur as the predicted position in future and the characteristic of the interference source overlap with the spatial position of the communication means and the characteristic used by the communication means.

Although the present invention is described as a hardware configuration in the above-described example embodiments, the present invention is not limited to the hardware configurations. In the present invention, any of the processes can be implemented by having a CPU (Central Processing Unit) execute a computer program. Further, the program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), CD-R, CD-R/W, and a semiconductor memory (such as a mask ROM, a PROM (Programmable ROM), an EPROM (Erasable PROM), a flash ROM, and a RAM (Random Access Memory). Further, the programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

This application is based upon and claims the benefit of priority from Japanese patent application No. 2019-050762, filed on Mar. 19, 2019, the disclosure of which is incorporated herein in its entirety by reference.

REFERENCE SIGNS LIST

1 RADIO COMMUNICATION APPARATUS
10 COMMUNICATION SELECTING MEANS
11a, 11b, 11c COMMUNICATION MEANS
20 RADIO-WAVE MEASUREMENT MEANS
30 INTERFERENCE SOURCE PREDICTION MEANS
40 STORAGE UNIT
50 INTERFERENCE DETERMINATION MEANS
60 SWITCHOVER RECOMMENDATION MEANS
71, 72 COMMUNICATION USER

What is claimed is:

1. A radio communication apparatus comprising:
   a processor; and
   a memory storing instructions executable by the processor to:
   switch a plurality of communication devices from one to another;
   hold spatial positions of a plurality of fixed stations for the communication devices or semi-fixed stations for which position information can be acquired, and a characteristic of a radio wave that is used by the radio communication apparatus;
   monitor a position of an interference source that will interfere with the communication radio communication apparatus, and predicting the position, a moving direction, and a characteristic of the interference source;
   determine whether or not interference will occur as the spatial position and the characteristic of the radio wave overlap with the position and the characteristic of the interference source that has been predicted; and
   find an appearance of the interference source, specifying the position and the characteristic of the interference source, by measuring a propagation status of radio waves, and notify the interference source.

2. The radio communication apparatus according to claim 1, wherein
   the communication devices include a wireless LAN device, and
   the interference source includes a radio-wave source or an obstacle that enters an area of a radio network formed by the plurality of the fixed stations for the wireless LAN device or the semi-fixed stations for which position information can be acquired.

3. The radio communication apparatus according to claim 2, wherein the processor predicts a collision between the moving direction, the speed, and the characteristic of the interference source in the area and the spatial positions and a propagative relative position of the radio wave in the area.

4. The radio communication apparatus according to claim 1, wherein the instructions are executable by the processor to further receive information indicating that interference will occur, and instructs switch from one communication device to another communication device.

5. A communication means switching method performed by a radio communication apparatus and comprising:
   switching a plurality of communication devices from one to another;
   holding spatial positions of a plurality of fixed stations for the communication devices or semi-fixed stations for which position information can be acquired, and a characteristic of a radio wave that is used by the radio communication apparatus;

monitoring a position of an interference source that will interfere with the communication radio communication apparatus, and predicting the position, a moving direction, and a characteristic of the interference source;

determining whether or not interference will occur as the spatial position and the characteristic of the radio wave overlap with the position and the characteristic of the interference source that has been predicted; and finding an appearance of the interference source, specifying the position and the characteristic of the interference source, by measuring a propagation status of radio waves, and notifying the interference source.

6. The communication means switching method according to claim 5, wherein the plurality of devices include a wireless LAN device.

7. A non-transitory computer readable medium storing a communication means switching program for causing a radio communication apparatus to perform:

switching a plurality of communication devices from one to another;

holding spatial positions of a plurality of fixed stations for the communication devices or semi-fixed stations for which position information can be acquired, and a characteristic of a radio wave that is used by the radio communication apparatus;

monitoring a position of an interference source that will interfere with the communication radio communication apparatus, and predicting the position, a moving direction, and a characteristic of the interference source;

determining whether or not interference will occur as the spatial position and the characteristic of the radio wave overlap with the position and the characteristic of the interference source that has been predicted; and finding an appearance of the interference source, specifying the position and the characteristic of the interference source, by measuring a propagation status of radio waves, and notifying the interference source.

8. The non-transitory computer readable medium according to claim 7, wherein the plurality of communication devices include a wireless LAN device.

* * * * *